US007543671B2

(12) United States Patent
Donaldson

(10) Patent No.: US 7,543,671 B2

(45) Date of Patent: Jun. 9, 2009

(54) VEHICLE WITH VARIABLE-LENGTH WHEELBASE

(75) Inventor: James A. Donaldson, Puyallup, WA (US)

(73) Assignee: Genie Industries, Inc., Redmond, WA (US)

( * ) Notice: Subject to any disclaimer, the term of this patent is extended or adjusted under 35 U.S.C. 154(b) by 0 days.

(21) Appl. No.: 11/772,765

(22) Filed: Jul. 2, 2007

(65) Prior Publication Data

US 2009/0008175 A1 Jan. 8, 2009

(51) Int. Cl.
*B62D 61/12* (2006.01)
*E06C 5/00* (2006.01)

(52) U.S. Cl. ........................ 180/209; 212/301; 182/69.4

(58) Field of Classification Search ................. 180/209, 180/24.02, 21; 280/142.2; 212/301; 182/69.4
See application file for complete search history.

(56) References Cited

U.S. PATENT DOCUMENTS 2,977,769 A * 4/1961 Troche ........................ 60/470
3,856,149 A * 12/1974 Shaw ......................... 212/301
4,759,685 A * 7/1988 Souda ........................ 414/680
4,942,529 A * 7/1990 Avitan et al. .................. 701/50
5,021,917 A * 6/1991 Pike et al. ................... 361/195
5,107,955 A * 4/1992 Kishi ......................... 182/2.1
5,996,722 A * 12/1999 Price .......................... 180/403
6,065,556 A * 5/2000 Andrews ..................... 180/209
6,135,694 A * 10/2000 Trego et al. .................... 414/21
6,293,579 B1 * 9/2001 Schaeff ...................... 280/638
6,585,079 B1 * 7/2003 Weyer ........................ 182/2.7
RE39,477 E * 1/2007 Nellers et al. ............... 280/754
2004/0031649 A1 * 2/2004 Schiebel et al. ............. 187/223

FOREIGN PATENT DOCUMENTS

WO WO 9210390 A1 * 6/1992

* cited by examiner

*Primary Examiner*—John Q. Nguyen
*Assistant Examiner*—Nicole Verley
(74) *Attorney, Agent, or Firm*—Brooks Kushman P.C.

(57) ABSTRACT

A vehicle with a variable-length wheelbase is disclosed. The vehicle of one embodiment has a first body portion coupled to a first set of wheels and a second body portion coupled to a second set of wheels to define a vehicle wheelbase. The first and second body portions are moveable relative to each other in a direction substantially parallel to a longitudinal axis of the vehicle, so as to move the base between extended and retracted positions. When the base is in the retracted position the vehicle's wheelbase has a first length, and when the base is in the extended position the wheelbase has a second length greater than the first length. A boom is pivotally coupled to the base. The boom moves toward a lowered position when the base is moved toward the extended position, and the boom moves toward a raised position when the base is moved toward the retracted position.

26 Claims, 6 Drawing Sheets

VEHICLE WITH VARIABLE-LENGTH WHEELBASE

TECHNICAL FIELD

The following disclosure relates generally to reach-type vehicles having a stabilizing system to resist tipping forces.

BACKGROUND

Adjustable support systems for vehicles have been developed to increase the stability of the vehicle during various types of operations. As an example, adjustable support systems have been used to add stability while operating a lift with a basket or while operating other tools (e.g., tools found on excavators). Increased stability is often provided by laterally extending vehicle support systems having wheels on telescoping axles that can be extended to increase the width of the vehicle's wheel track. Other support systems include laterally deployable stabilizer arms, independent from the wheels, that can be lowered in a vertical plane to effectively increase the width of the vehicle's track.

A vehicle support system is shown in published U.S. Patent Application Publication No. 2005/0212253, entitled "Vehicle Support System," and published Sep. 29, 2005. The system includes two support assemblies pivotally coupled to a base. A control mechanism couples the two support assemblies together and controls the pivotal movement of the support assemblies relative to the vehicle's base between spread and stowed positions. While the disclosed vehicle support system provides a significant improvement over the prior art, there is a need for a vehicle with a variable wheelbase to provide improved performance in certain areas.

SUMMARY

The present invention is generally directed toward a vehicle having a variable length wheelbase. In one embodiment, the vehicle has a base having a longitudinal axis and first and second body portions. The first body portion is coupled to a first set of wheels, and the second body portion is coupled to a second set of wheels longitudinally spaced apart from the first wheels to define a vehicle wheelbase. The first and second body portions are moveable relative to each other in a direction substantially parallel to the longitudinal axis so as to move the base between extended and retracted positions. When the base is in the retracted position the vehicle's wheelbase has a first length, and when the base is in the extended position the wheelbase has a second length greater than the first length. A boom is pivotally coupled to the base. The boom is moveable relative to the body portion in response to movement of the base between the extended and retracted positions. The boom moves toward a lowered position when the base is moved toward the extended position, and the boom moves toward a raised position when the base is moved toward the retracted position.

Another aspect of the invention is directed toward an extendible vehicle assembly having a body with a longitudinal axis and first and second body portions coupled to first and second ground-engaging members, respectively. The first and second ground-engaging members are longitudinally spaced apart from each other to define a variable support base. The first and second body portions are moveable longitudinally between extended and retracted positions. When the body is in the retracted position the support base has a first length, and the when the body is in the extended position the support base has a second length greater than the first length. An extendible boom is pivotally coupled to the base and is moveable between raised and lowered positions in a vertical plane relative to the body. The boom assembly simultaneously moves toward the lowered position when the body is moved toward the extended position, and the boom assembly simultaneously moves toward the raised position when the body is moved toward the retracted position.

DETAILED DESCRIPTION

The present disclosure describes vehicle support systems. Several specific embodiments are set forth in the following description and in FIGS. 1-7 to provide a thorough understanding of certain embodiments of the invention. One skilled in the art, however, will understand that the present invention may have additional embodiments, and that other embodiments of the invention may be practiced without several of the specific features explained in the following description.

Figure 1:
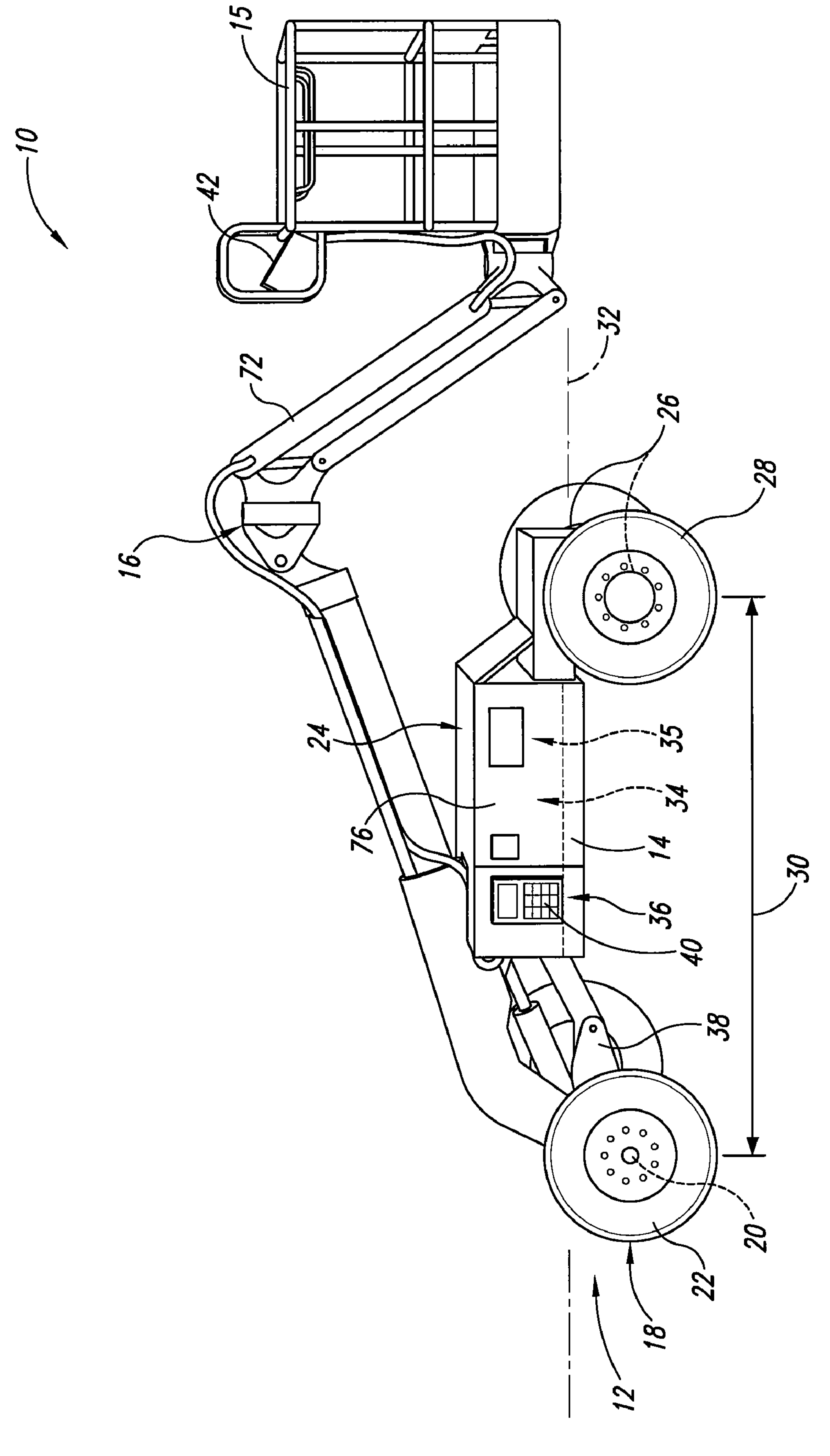
FIG. 1 is a front isometric view of an extendible vehicle with a body shown in the extended position and with a boom in a lowered position in accordance with an embodiment of the invention.
Figure 2:
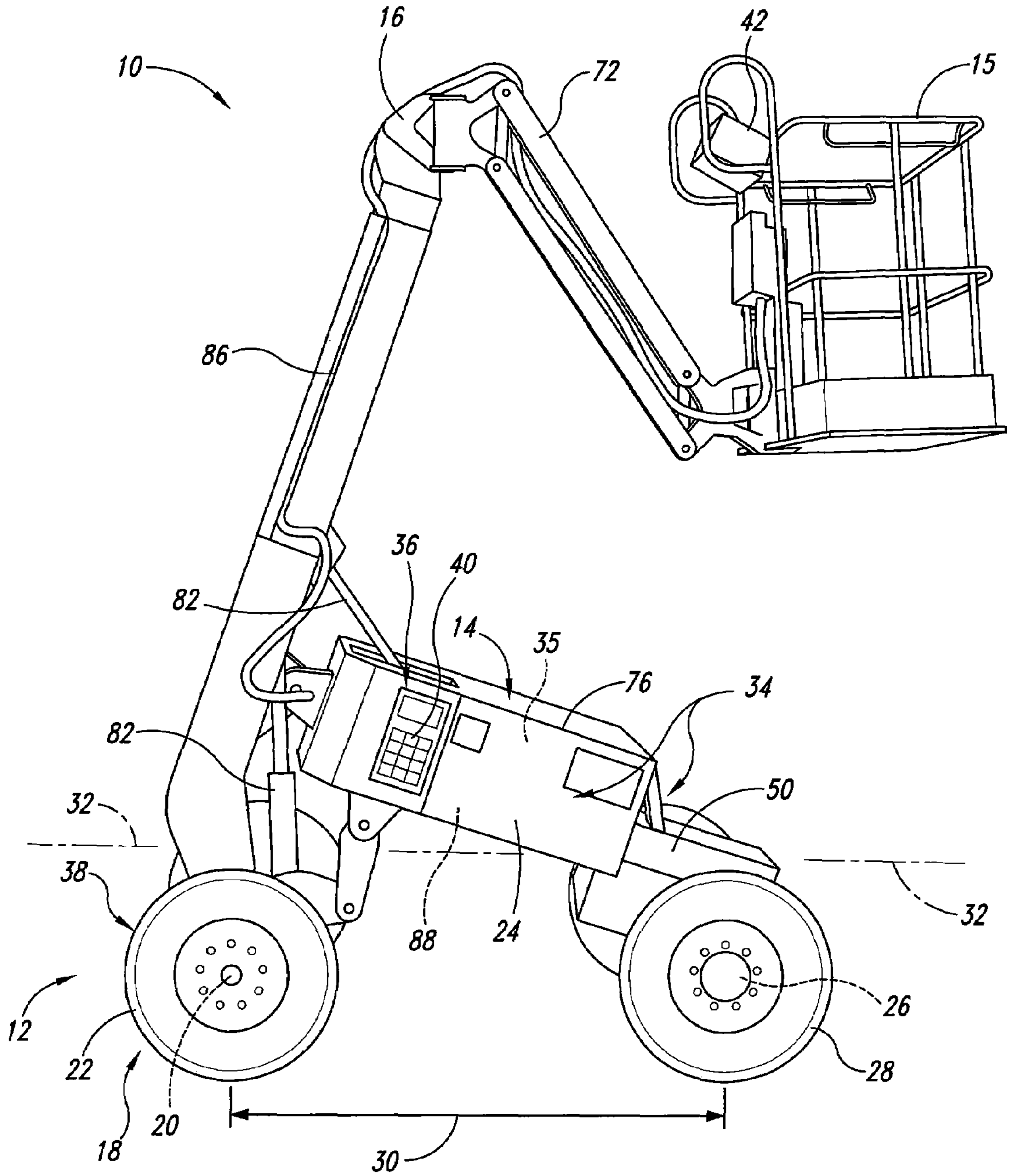
FIG. 2 is a front isometric view of the extendible vehicle of FIG. 1 with the body shown in a retracted position and the boom shown in a raised position.

FIG. 1 is a front isometric view of an extendible vehicle 10 with a base 12 having a body 14 shown in an extended position. A boom 16 is pivotally attached to the base 12 and is shown in a lowered position in accordance with an embodiment of the invention. FIG. 2 shows the vehicle's body 14 in a retracted position and the boom 16 in a raised position. The vehicle 10 of the illustrated embodiment is an extendable reach-type personnel lift with a personnel basket 15 on the distal end of the boom 16. Other embodiments, however, can include other reach-type extendable vehicles, such as lift vehicles, light towers, or other personnel lifts.

The body 14 of the vehicle 10 has a front portion 18 coupled to a front axle 20 and steerable front wheels 22. The body 14 also has a rear portion 24 coupled to a rear axle 26 and rear wheels 28, which are spaced longitudinally apart from the front axle 20 and front wheels 22. The distance between the front and rear wheels 22 and 28 defines a wheelbase 30 of the vehicle. As discussed in greater detail below, the front and rear portions 18 and 24 of the body 14 are longitudinally moveable in a direction substantially parallel with the vehicle's longitudinal axis 32 between an extended position (FIG. 1) and a retracted position (FIG. 2). Accordingly, the base 12 of the vehicle 10 can be longitudinally extended or retracted so as to increase or decrease the vehicle's wheelbase 30, thereby adjusting the longitudinal stability of the vehicle for different operating positions or conditions.

In the illustrated embodiment, the body 14 includes a drive system 34 operatively coupled to the rear wheels 28 and configured to propel the vehicle 10 forwardly or rearwardly. The drive system 34 in the illustrated embodiment includes the power plant 35 that has an electric motor to drive the rear wheels 28. In other embodiments, power plant 35 can include an internal combustion engine, a hybrid system with an electric motor and an combustion engine, or one or more other motors. In another embodiment, the vehicle 10 can have a front wheel drive configuration, wherein power from the power plant 35 is provided to the front wheels 22. In yet another embodiment, the vehicle 10 can have an all-wheel drive configuration wherein power from the power plant 35 is simultaneously provided to the front and rear wheels 22 and 28 to propel the vehicle. In yet another embodiment, the drive system can be shifted between rear wheel drive, front wheel drive, and all-wheel drive configurations.

The vehicle 10 also has a control system 36 that allows a user to operate the various aspects of the vehicle. The control system 36 is also configured to automatically control or limit other aspects of the vehicle's operation. In the illustrated embodiment, the control system 36 is coupled to the drive system 34 so as to allow an operator to control the speed and direction of the vehicle's movement. The control system 36 is also coupled to a steering system 38 that is used to control the angular orientation of the front wheels 22 (or other steerable wheels). The control system 36 also regulates the speed at which the vehicle 10 can be driven as a function of the boom's angular orientation of the base's position between the extended and retracted positions.

In the illustrated embodiment, a control panel 40 is located on the side of the body 14 in a convenient location from which an operator can control aspects of the vehicle. A secondary control unit 42 is also located in the personnel basket 15 that allows an operator to drive and control the vehicle while standing in the personal basket. The control panel 40 and the secondary control unit 42 are also coupled to a hydraulic system 80 configured to control the movement and position of the boom 16 between a lowered position (FIG. 1) and a raised position (FIG. 2). Other embodiments can include control panels or control units in other locations that allow for convenient and safe operation of the vehicle 10.

Figure 3:
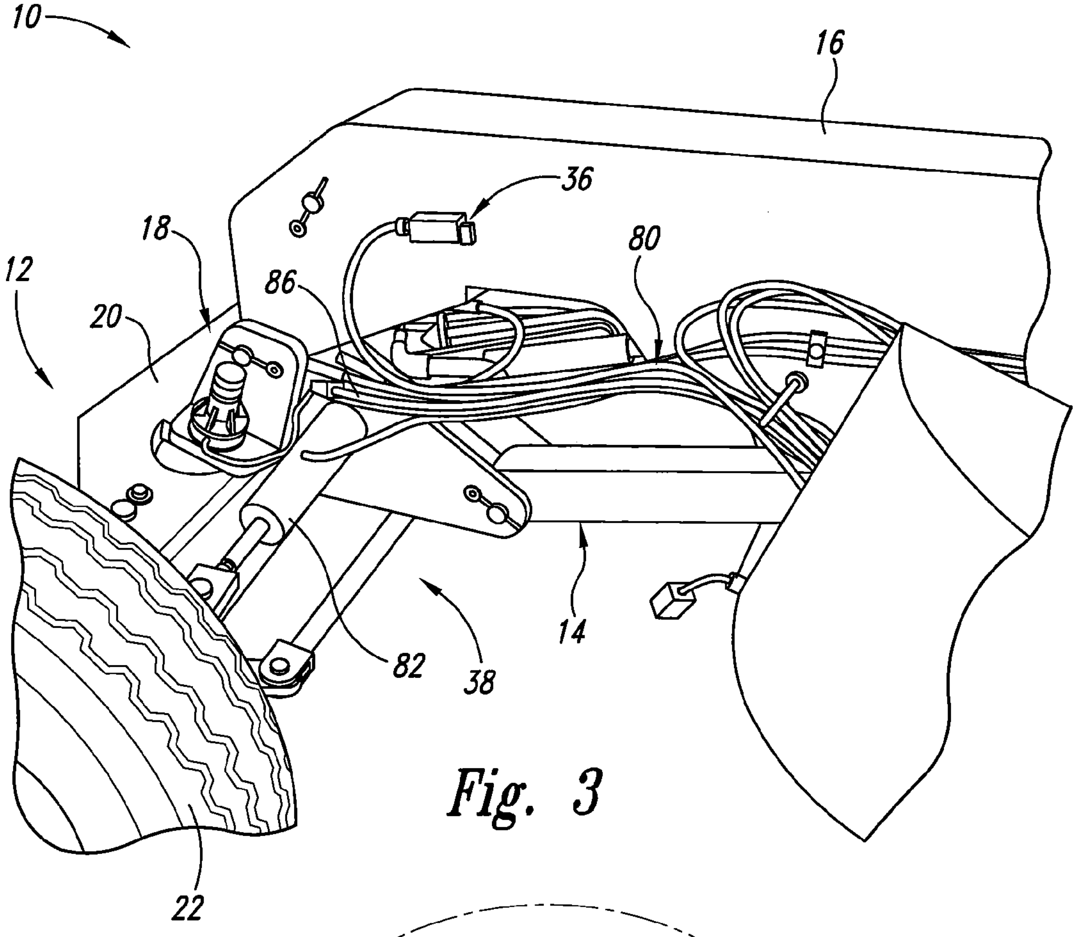
FIG. 3 is an enlarged rear isometric view of the front end of the vehicle of FIG. 1.
Figure 4:
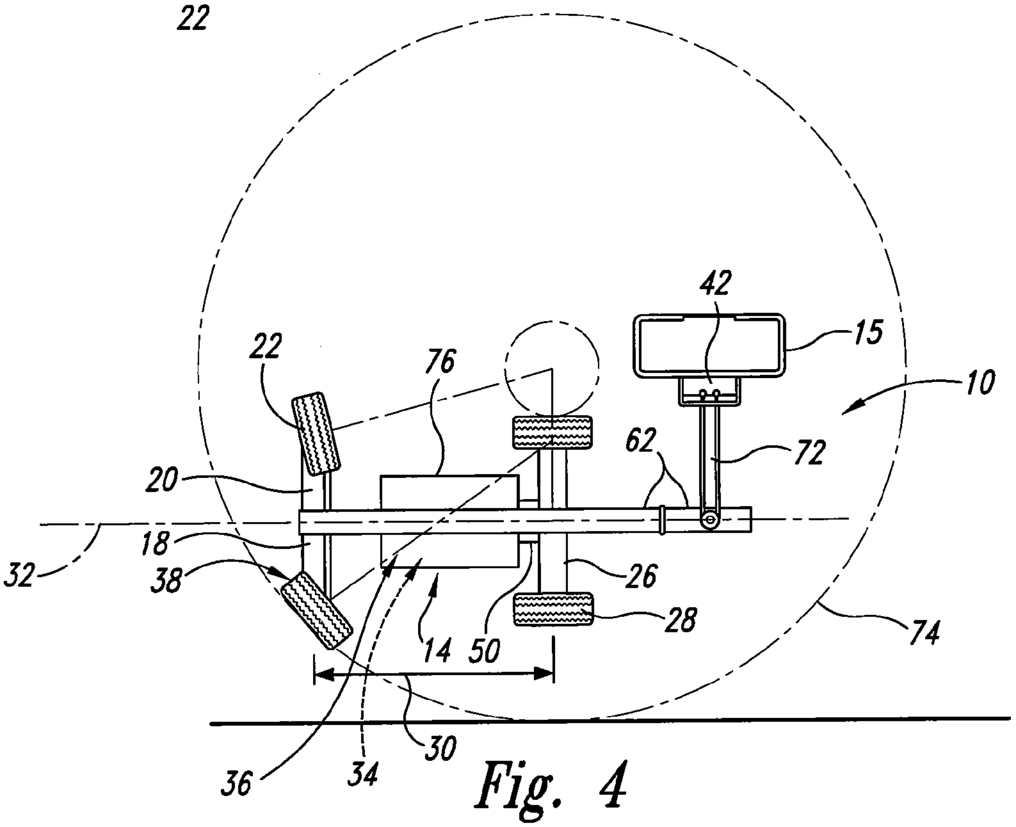
FIG. 4 is a schematic view of the vehicle of FIG. 1 with a high aspect steering arrangement and the associated turning radius.

FIG. 3 is an enlarged rear isometric view of the front portion 18 of the vehicle 10 showing a portion of the steering system 38 coupled to the front axle 20 and the front wheels 22. The steering system 38 is configured to allow an operator to turn the front wheels 22 relative to the front axle 20 and the body 14 through a range of angles, thereby allowing the operator to steer the vehicle 10 while driving. In the illustrated embodiment shown in FIG. 3, the steering system 38, the front axle 20, and the front wheels 22 are configured for high angle steering, wherein the front wheels can turn through a wide range of angular orientations relative to the front axle. As shown in FIG. 4, the high angle steering provides a tight turning radius 74 for enhanced maneuverability of the vehicle.

In other embodiments, the steering system 38 can be coupled to steerable rear wheels so the vehicle can be steered by turning the rear wheels relative to the rear axle. In another embodiment, the front wheels and rear wheels are each steerable to allow for a desired range of control and maneuverability of the vehicle. In such an embodiment, the control system 36, the drive system 34, and the steering system 38 can be configured for an all-wheel steering configuration, including a crab-steering configuration.

In the illustrated embodiment, the steering system 38, the control system 36, and the drive system 34 are also configured to limit the maximum operating speed of the vehicle to avoid creating tipping condition in the various vehicle configurations and positions. In one embodiment, the control system 36 includes a programmed or programmable on-board computer configured to monitor the vehicle's speed, boom configuration (including its angular orientation), and the body configuration (including its angular orientation). The control system 36, via the on-board computer, adjusts the vehicle's maximum operating speed in either a forward or rearward direction is limited as a function of the angular orientation of the front wheels 22 and as a function of the boom's position between the lowered and raised positions and the body's position between the extended and retracted positions.

When the front wheels 22 are turned to a maximum angular orientation and/or the boom 16 is in the fully raised position while the body 14 is in the fully retracted position (FIG. 2), the vehicle's restricted maximum driving speed is significantly limited to avoid unstable conditions that could create a risk of tipping the vehicle during operation. On the other hand, when the front wheels 22 are straight or turned only slightly, with the boom 16 in the fully lowered position and the body 14 in the fully extended position, the vehicle is most stable and the control system 36 and drive system 34 are configured to allow the operator to drive the vehicle up to its highest maximum speed.

The control system 36 and/or the drive system 34 can also be configured to continuously or consecutively adjust the maximum operating speed at which the vehicle can be driven when the boom is raised or lowered to an intermediate position and when the front and rear portions 18 and 24 of the body 14 are longitudinally adjusted to an intermediate position between the extended and retracted positions. For example, the vehicle 10 can have a plurality of position and speed sensors coupled to the control system 36 and/or the drive system 34. When the sensors detect that the boom 16 is being rotated upwardly toward the raised position and that the body 14 is being moved toward the retracted position, the control system can automatically reduce the vehicle's maximum operating speed for that vehicle configuration.

Figure 5:
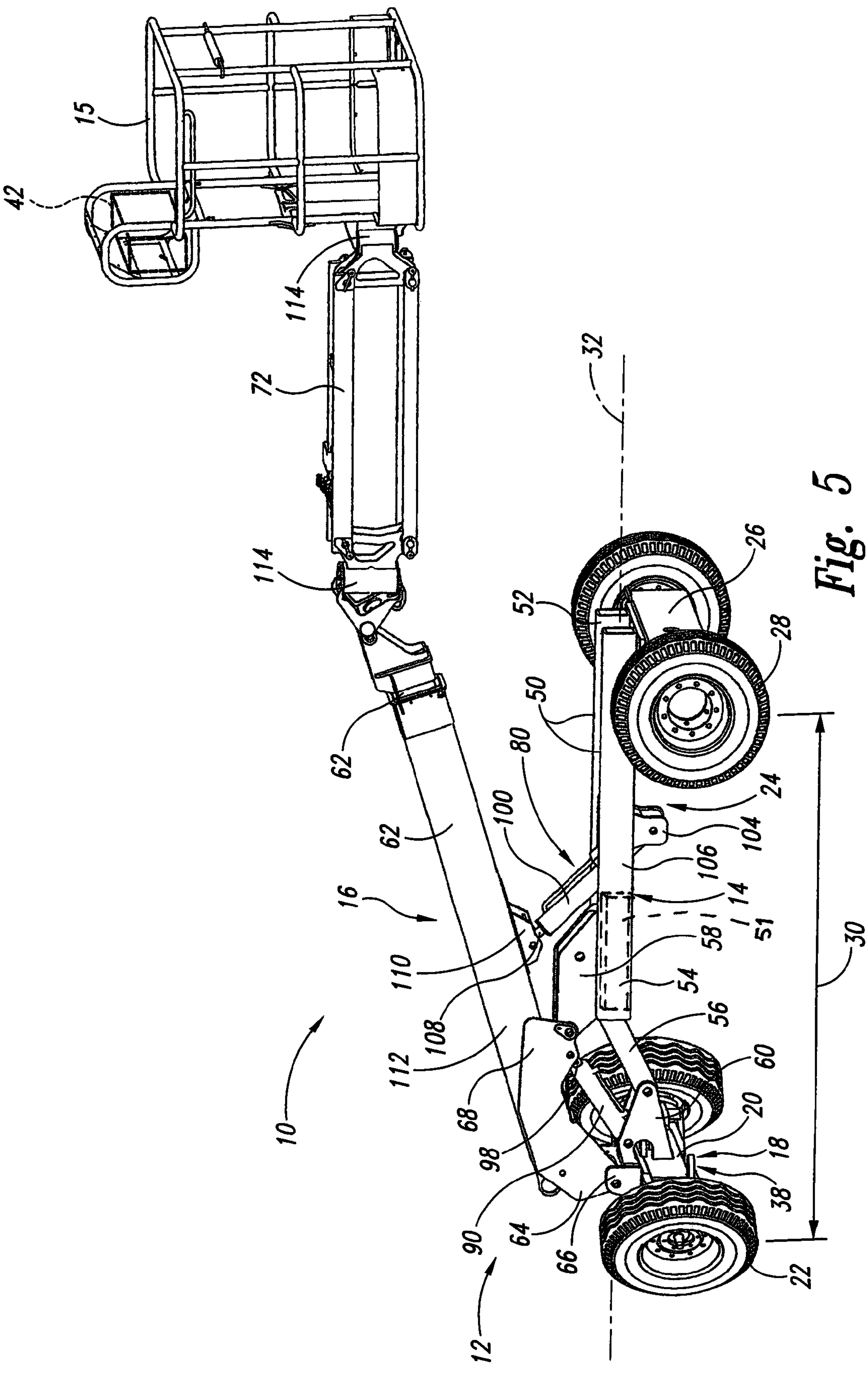
FIG. 5 is an isometric partial view of the vehicle of FIG. 1 with the body shown in the extended position and the boom shown in the lowered position, and wherein portions of the body are not illustrated for purposes of clarity.
Figure 6:
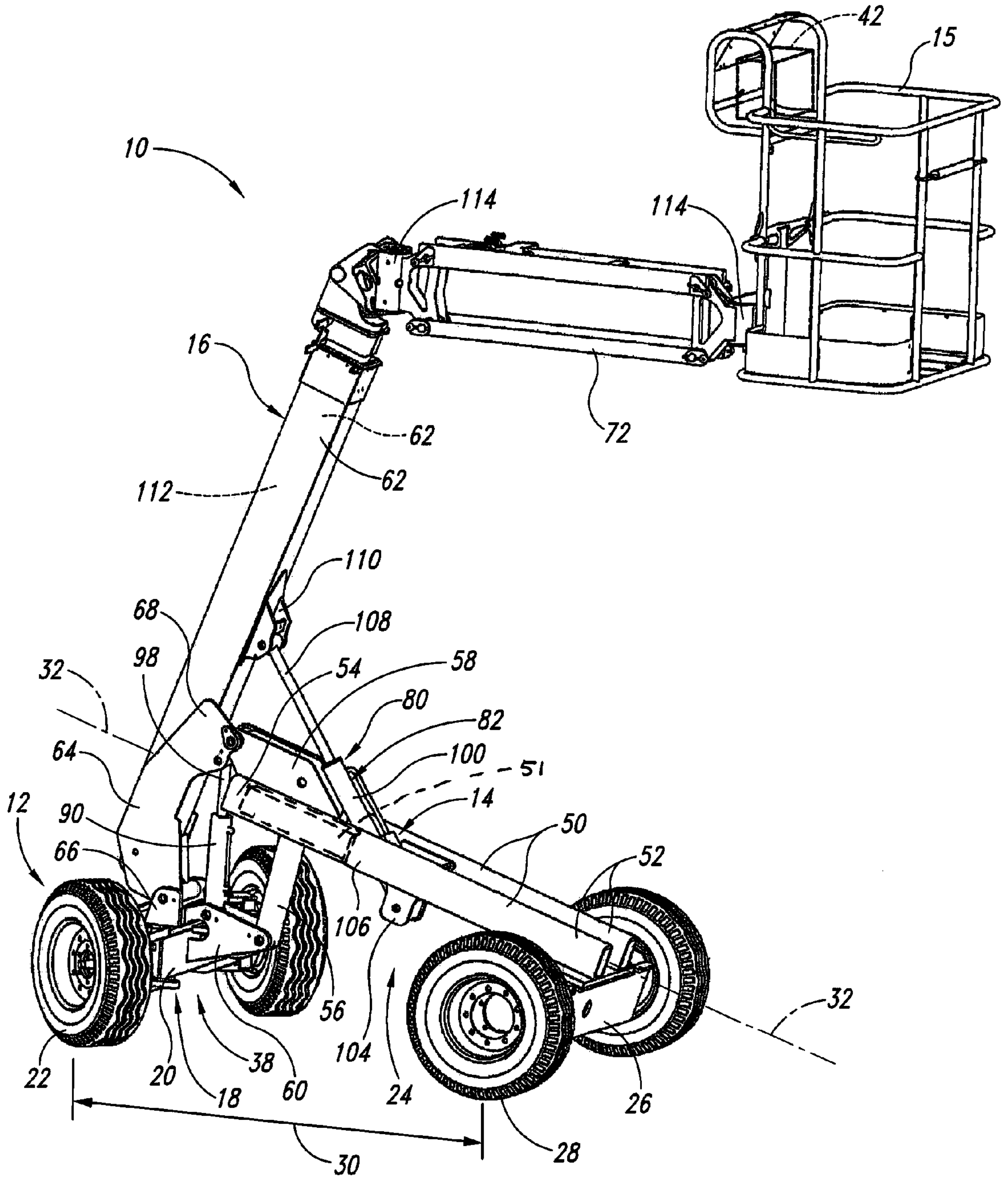
FIG. 6 is an isometric partial view of the vehicle of FIG. 5 with the body shown in the retracted position and the boom shown in the raised position, and wherein portions of the body are not illustrated for purposes of clarity.

In the illustrated embodiment, the body 14 of the vehicle 10 is longitudinally adjustable between the extended and retracted positions by articulating or otherwise longitudinally moving the body's rear portion 24 relative to the front portion 18. FIG. 5 is an isometric partial view of the vehicle 10 of FIG. 1 with the front and rear portions 18 and 24 of the body 14 shown in an extended position. FIG. 6 is an isometric partial view of the vehicle 10 of FIG. 5 with the front and rear portions 18 and 24 of the body 14 shown in the retracted position. Selected portions of the vehicle 10 are not illustrated in FIGS. 5 and 6 for purposes of clarity and description.

The body's rear portion 24 in the illustrated embodiment includes a pair of rigid frame rails 50 substantially parallel with the vehicle's longitudinal axis 32. The frame rails 50 are rigidly connected at their rear ends 52 to the rear axle 26 between the rear wheels 28. A mounting member 58 is rigidly attached to a front portion 54 of the frame rails 50, and the mounting member is pivotally attached to one end of a rigid link member 56. The other end of the link member 56 is pivotally connected to a rigid mounting member 60 on the body's front portion 18.

The link member 56 pivots relative to the mounting members 58 and 60 so as to allow the body's rear portion 24 to move longitudinally in the forward or rearward direction relative to the body's front portion 18 and substantially parallel to the vehicle's longitudinal axis 32. When the body 14 is in the fully extended position, the front end portions 54 of the frame rails 50 are spaced rearwardly away from the body's front portion 18, and the link member 56 is in a lowered position. The rear wheels 28 are spaced apart from the front wheels 22 by a first distance to define an extended wheelbase configuration. When the body 14 is in the retracted position, as shown in FIG. 6, the link member 56 is in a forward position, such that the front portions 54 of the frame rails 50 and the mounting member 58 are supported vertically above the mounting member 60 on the body's front portion 18. In this position, the rear wheels 28 are spaced apart from the front wheels 22 by a shorter distance to define a shortened wheelbase configuration.

In the illustrated embodiment, the length of the wheelbase 30 and the associated position of the body's front and rear portions 18 and 24 are directly related to the angular orientation of the boom 16. In the illustrated embodiment, the boom 16 has extendible telescoping boom sections 62 pivotally mounted at the boom's proximal end 64 to a pivot mount 66 rigidly fixed on the body's front portion 18 adjacent to the mounting member 60. The boom 16 also has a reinforced intermediate connector 68 above the pivot mount 66 and pivotally connected to the mounting member 58 on the frame rails 50. The resulting direct interconnection between the boom 16 and the body's rear portion 24 restricts lateral movement of the boom's telescoping sections 62 relative to the body 14 and the longitudinal axis 32. Accordingly, the pivoting movement of at least the boom's telescoping sections 62 is in a plane substantially parallel to the vehicle's longitudinal axis 32.

The direct interconnection between the boom 16 and body's rear portion 24 at the frame rails 50 via the link member 56 causes simultaneous movement of the boom 16 and the body's front and rear portions 18 and 24. When the vehicle's body 14 is in the extended position with the long wheelbase 30, the boom 16 is securely retained in the lowered position. As the body's rear portion 24 is moved forwardly (and upwardly because of the pivoting motion of the link member) to shorten the wheelbase 30, the boom 16 is automatically pivoted upwardly about the pivot mount 66 and moves toward the raised position. Accordingly, when the body 14 is in the intermediate position between the extended and retracted positions, the boom 16 is also in the intermediate position between the raised and lowered positions. When the body 14 is in the fully retracted position, the boom 16 is in the fully raised position.

In the illustrated embodiment, the vehicle 10 includes a hydraulic system 80 coupled to the control system 36 and configured to control movement of the body 14, the boom 16, and the personnel basket 15. The hydraulic system 80 can also be coupled to the steering system 38 and configured to allow an operator to control the angular orientation of the front wheels 22 (and/or the rear wheels 28). The hydraulic system 80 includes a plurality of lift cylinders 82 coupled to a hydraulic fluid source by a plurality of hydraulic lines or hoses 86 (FIG. 2). In one embodiment, the hydraulic fluid source can be contained in a tank 88 (FIG. 2) connected to the body's rear portion 24 and supported by the frame rails 50. In another embodiment, the tank 88 can be connected to the body's front portion 18 adjacent to the front axle 20.

As best seen in FIGS. 5 and 6, the vehicle 10 also includes a main lift cylinder 100 extending between the body's rear portion 24 and the boom 16. In the illustrated embodiment, the main lift cylinder 100 is pivotally connected to mounting plates 104 rigidly fixed to central portions 106 of the frame rails 50. The main lift cylinder 100 is also pivotally attached at its other end, which is the end of an actuator rod 108, to a pair of mounting brackets 110 rigidly fixed to the boom 16 at a position above the boom's intermediate connector 68.

In the illustrated embodiments, the main lift cylinder 100 is configured to extend and retract to move the body 14 and the boom 16. As the main lift cylinder 100 is actuated and extended, the main lift cylinder pushes the boom 16 toward the raised position. The body's rear portion 24 is simultaneously drawn forwardly toward the body's front portion 18, thereby decreasing the length of the vehicle's wheelbase 30. As the main lift cylinders 100 is retracted, the main lift cylinder pulls the boom 16 toward the lowered position. The body's rear portion 24 is simultaneously pushed rearwardly away from the body's front portion 18 to increase the length of the vehicle's wheelbase 30.

In the illustrated embodiment, the control system 36 can be configured to activate front brakes on the front wheels 22 only, so the body's front portion 18 remains stationary as the rear portion 24 is drawn toward the front portion. In other embodiments, rear brakes can be applied to the rear wheels 28 so that the front wheels 22 can roll as the body's front portion 18 is drawn toward the body's rear portion 24 when the body 14 is moved toward the retracted position. In another embodiment, both the front and rear wheels 22 and 28 can be free to roll when the main lift cylinder 100 is activated.

The hydraulic system 80 of the illustrated embodiment includes a master cylinder 90 coupled to one or more slave cylinders (not shown) and configured to help keep the personnel basket 15 level during movement of the boom 16. The master cylinder is pivotally connected at one end to the mounting member 60 on the body's front portion 18. In the illustrated embodiment, the master cylinder 90 is connected to the mounting member 60 forward of the pivotal connection between the mounting member and the link member 56 discussed above. In this arrangement, the master cylinder 90 does not impede movement of the link member 56 as the body moves between the extended and retracted positions. The other end of the master cylinder 90, which is the end of a rigid actuator rod 98, is pivotally connected to the reinforced intermediate connector 68 on the boom 16. This connection is just below the connection between the intermediate connector 68 and the mounting member 58 on the body's rear portion 24. The master cylinder 90 is also positioned to avoid impeding motion of the boom 16 relative to the body's rear portion 24 during movement between the extended and retracted positions. The master cylinder 90 is compressed or extended as the boom 16 moves between the raised and lowered positions, thereby driving hydraulic fluid to or from the one or more slave cylinders.

The hydraulic system 80 also includes one or more other lift cylinders 112 coupled to the boom's telescoping sections 62 to extend and retract the boom 16. Laterally rotatable cylinders 114 are also coupled to the boom's jib 72 and the personnel basket 15 to control the lateral movement of these components. A jib cylinder (not shown) can also be used to control the vertical movement of the jib 72. The hydraulic system 80 is also operatively coupled to the secondary control unit 42 in the personnel basket 15 so an operator can control the vehicle's movement via the hydraulic system from within the personnel basket.

Figure 7:
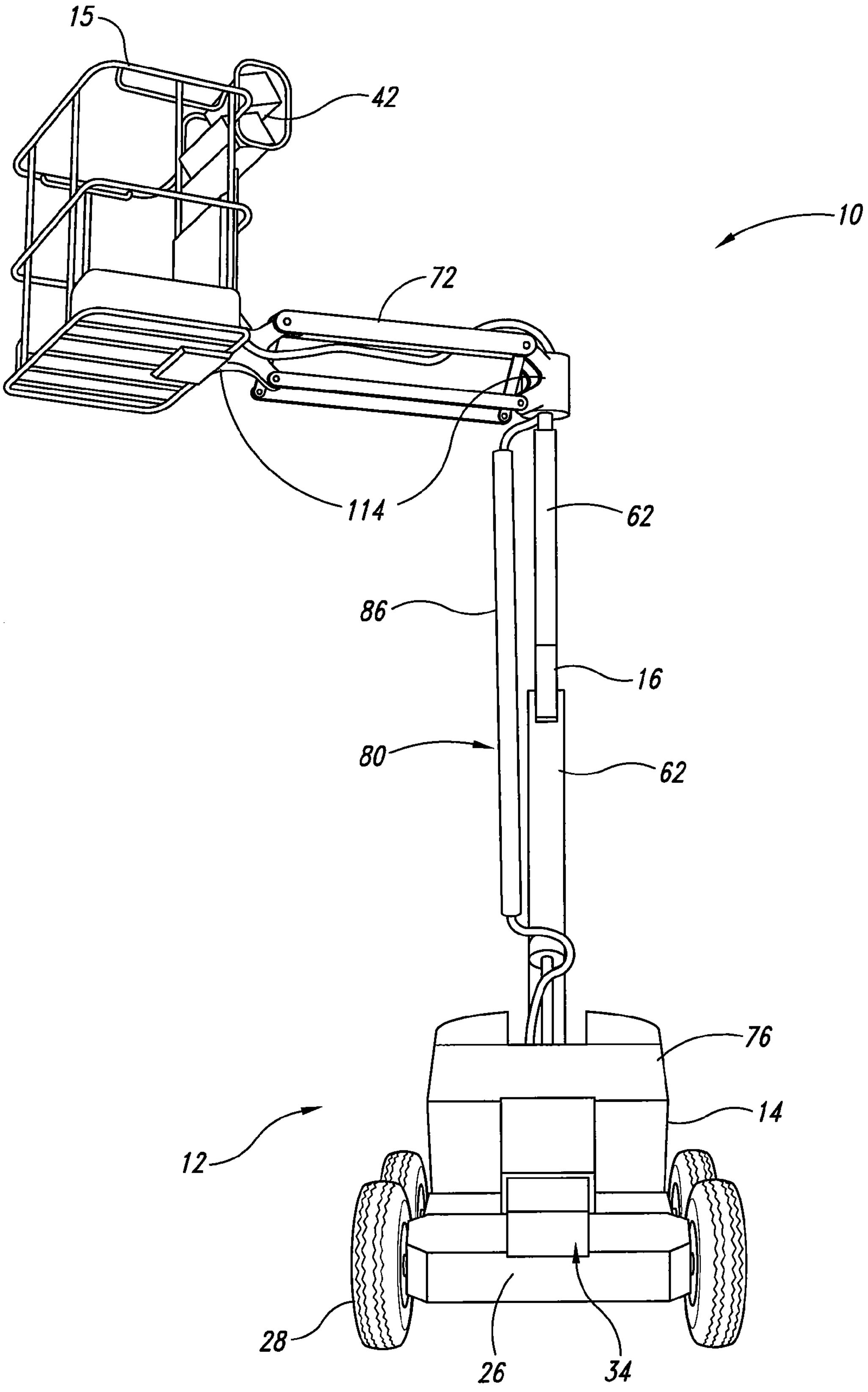
FIG. 7 is a front elevation view of the vehicle of FIG. 1 with the boom in an extended position with a jib and a personnel basket shown in a laterally disposed position.

FIG. 7 is a front elevation view of the vehicle of FIG. 1 with the boom 16 in an extended position and with the jib 72 and personnel basket 15 shown in a laterally disposed position. In the illustrated embodiment, the telescoping sections 62 of the boom 16 can be axially moved between extended and retracted positions to adjust the length of the boom. The jib 72 is pivotally attached to a laterally rotatable cylinder 114, which is connected to the distal end of one of the boom's telescoping sections 62. The other end of the jib 72 is pivotally connected to the personnel basket 15 by another laterally rotatable cylinder 114. The jib 72 of the illustrated embodiment can be pivoted vertically and laterally relative to the boom's telescoping sections 62 and to the vehicle's longitudinal axis 32. The jib 72 of the illustrated embodiment has a substantially fixed length. Other embodiments, however, can include a telescoping or axially extendible jib to provide for an adjustable axial reach of the jib and personnel basket in the axial or lateral directions.

As described above and shown in FIG. 4, the vehicle of the illustrated embodiment has a tight turning radius 74 because of the vehicle's steering system 38 and the high angle steering of the front wheels 22. This tight turning radius 74 allows an operator to easily and accurately position the vehicle 10 in a desired location relative to a selected work area. The boom 16 can then be moved to a selected position at or between the raised and lowered positions, thereby automatically adjusting the length of the vehicle's wheelbase 30. The boom 16 can also be axially extended as needed to a selected length, and the jib 72 can be positioned at a selected lateral orientation so as to allow an operator in the personnel basket 15 to easily and comfortably reach the work area.

If the boom's telescoping sections 62, the jib 72, and/or the personnel basket 15 need to be moved to a position beyond the vehicle's reach, the tight steering and turning radius 74 of the vehicle 10 allows the operator to easily and quickly reposition the vehicle within reach of the desired location. The vehicle maintains its stability during such repositioning because of the direct relationship between the length of the wheelbase 30 and the position of the boom. The vehicle also maintains its stability because the control system 36 can limit the maximum operating speeds and positions of the vehicle for various vehicle configurations to ensure the vehicle will not move into a configuration highly susceptible of tipping. Accordingly, the vehicle 10 provides for increased maneuverability, particularly when the boom is in the raised position. This increased maneuverability also enables the vehicle to perform without using a conventional turntable attached to the boom.

As best seen in FIG. 2, the significant portions of the vehicle's drive system 34, the control system 36, and the hydraulic system 80 are substantially supported by the frame rails 50 and enclosed in a housing 76 coupled to the frame rails. In one embodiment, additional counterweights 51 (FIGS. 5 and 6) can be attached to the body 14, such as on the frame rails 50 within the housing 76. When the body 14 of the illustrated embodiment is moved towards the extended position portions of the frame rails 50, the counterweights 51 and other components connected to the frame rails move longitudinally rearward and vertically downward. Accordingly, the vehicle's center of gravity also moves longitudinally rearward parallel to the longitudinal axis 32 and vertically downward when the body is moved toward the extended position. Accordingly, the vehicle's center of gravity is a lower most position when the boom is in the lowered position, so the vehicle 10 is extremely stable even if the boom's telescoping sections 62 are fully extended.

In another embodiment, the vehicle 10 can include an adjustable counterweight assembly attached to the body 14. The adjustable counterweight assembly could include vertically translatable counterweights and a lift mechanism that raises or lowers the counterweights as the body is adjusted to decrease or increase the length of the wheelbase 30. This adjustable counterweight system could connect to the control system so the counterweights, the body, and the boom all move simultaneously as the boom is raised or lowered and as the wheelbase is extended or retracted.

The lower center of gravity provides for increased stability of the vehicle 10 so that less counterweight is needed. Accordingly, the vehicle will be lighter, easier, and less expensive to manufacture. The lighter vehicle also allows for a construction that can use lighter duty motors to drive the vehicle. Alternatively, the lighter vehicle can result in an increase in efficiency of the electric or internal combustion motors of the drive system. As a result, the vehicle can be less expensive to manufacture and/or to operate without sacrificing performance of the vehicle.

In one embodiment, the vehicle 10 can also include sensors that detect whether the vehicle is in a tipped orientation relative to horizontal, which may occur if the vehicle is on uneven ground. The control system 36 can be coupled to the sensors to detect a tipped condition and thereby restrict how far the boom 16 may be extended or how far the jib 72 can be pivoted laterally relative to the longitudinal axis without creating a risk of tipping.

From the foregoing, it will be appreciated that specific embodiments of the invention have been described herein for purposes of illustration, but that various modifications may be made without deviating from the spirit and scope of the invention. For example, in one embodiment, the front and rear portions 18 and 24 of the body 14 can be configured to move longitudinally relative to each other as the boom moves between the raised and lowered positions. This longitudinal movement can be an axially-directed movement rather than the pivoting movement created by the rigid link member 56 discussed above. In another embodiment, the vehicle 10 can include laterally extendible axles and wheels to increase the width of the vehicle's track if additional lateral stability is desired. Accordingly, the invention is not limited except as by the appended claims.

I claim:

1. An extendible vehicle assembly having a center of gravity, comprising:

a base having a longitudinal axis and first and second body portions, the first body portion being coupled to a first set of wheels and the second body portion being coupled to a second set of wheels longitudinally spaced apart from the first wheels to define a vehicle wheelbase, the first and second body portions configured to move relative to each other with an inboard end of the second body portion moving vertically and a region of the second body portion coupled to the second set of wheels moving substantially parallel to the longitudinal axis between extended and retracted positions, wherein when the base is in the retracted position the wheelbase has a first length relative to the longitudinal axis and the inboard end portion of the second body portion spaced away from the second set of wheels toward the first set of wheels is in a raised position and the center of gravity is in an elevated position, and when the base is in the extended position the wheelbase has a second length relative to the longitudinal axis greater than the first length and the end portion of the second body portion is in a first lowered position vertically lower than the raised position and the center of gravity is in a second lowered position vertically lower than the elevated position; and a boom assembly pivotally coupled to the base and configured to move relative to the base in response to relative movement of the first and second body portions, wherein the boom assembly pivots toward a lowered position when the base is moved toward the extended position and the center of gravity is moved toward the second lowered position, and the boom assembly pivots toward a raised position when the base is moved toward the retracted position and the center of gravity is moved toward the elevated position.

2. The vehicle of claim 1 wherein the boom assembly is mechanically linked to the body for movement between the raised and lowered positions simultaneously with movement of the base between the retracted and extended positions.

3. The vehicle of claim 1, further comprising:

a drive system coupled to at least one of the first and second set of wheels and configured to propel the vehicle; and a control system coupled to the drive system and the boom assembly, wherein the control system is configured to allow the drive system to propel the vehicle at a first speed when the boom assembly is in the lowered position, and the control system is configured to allow the drive system to propel the vehicle at a maximum second speed less than the first speed when the body is in the retracted position.

4. The vehicle of claim 1, further comprising:

a drive system coupled to at least one of the first and second set of wheels and configured to propel the vehicle; and a control system coupled to the drive system and the boom assembly, wherein the control system is configured to allow the drive system to propel the vehicle at a speed up to a variable maximum speed depending upon the position of the boom assembly between the lowered position and raised position.

5. The vehicle of claim 1 wherein the boom assembly has a proximal portion pivotally connected to the first body portion, a distal portion spaced apart from the first body portion, and an intermediate portion pivotally connected to the second body portion.

6. The vehicle of claim 1 wherein the first and second body portions are articulatable in a plane substantially parallel to the longitudinal axis.

7. The vehicle of claim 1 wherein the first and second body portions articulate in a plane substantially parallel to the longitudinal axis when the base is moved between the extended and retracted positions.

8. The vehicle of claim 1 wherein the boom assembly includes a telescoping boom portion and a support structure coupled to the telescoping boom portion.

9. The vehicle of claim 8 wherein the support structure is a personnel basket.

10. The vehicle of claim 1 wherein the boom assembly is moved relative to the base in a plane substantially parallel with the longitudinal axis.

11. The vehicle of claim 1 wherein the boom assembly has a first boom portion moveable relative to the body in a plane substantially parallel with the longitudinal axis, and wherein the boom assembly is substantially restricted from moving laterally relative to the plane.

12. The vehicle of claim 11 wherein the boom assembly has a second boom portion pivotally connected to a distal end of the first boom portion, and the second boom portion is moveable laterally relative to the plane.

13. The vehicle of claim 1 wherein the base includes a counterweight coupled to at least one of the first and second body portions, wherein the counterweight is moved vertically when the base is moved between the extended and retracted positions.

14. A vehicle assembly for use in extended-reach configurations, the vehicle assembly having a center of gravity, comprising:

a first axle portion;

first wheel assemblies coupled to the first axle portion, the first wheel assemblies being steerable relative to the first axle portion;

a second axle portion spaced apart from the first axle portion;

second wheel assemblies coupled to the second axle portion and being longitudinally spaced apart from the first wheel assemblies to define a wheelbase of the vehicle;

a base coupled to the first and second axle portions and having a longitudinal axis, the base having first and second base portions, the first base portion coupled to the first axle portion and the second base portion coupled to the second axle portion, the first and second base portions configured to be moved longitudinally relative to each other in a first direction substantially parallel to the longitudinal axis between extended and retracted positions with an end of one of the base portions moving in a second direction substantially normal to the wheelbase, wherein when the base is in the extended position the wheelbase is a first length relative to the longitudinal axis and the end portion of the second base portion spaced away from the second wheel assemblies toward the first wheel assemblies is in a raised position and the center of gravity is in an elevated position, and when the base is in the retracted position the wheelbase is a second length relative to the longitudinal axis shorter than the first length and the end portion of the second base portion is in a first lowered position vertically lower than the raised position and the center of gravity is in a second lowered position vertically lower than the elevated position;

a boom assembly having proximal and distal portions, the proximal portion being pivotally coupled relative to the first axle portion and being pivotally coupled to the base, and the distal portion being spaced apart from the first axle portion, wherein the boom assembly pivots toward a lowered position when the base is moved toward the extended position and the center of gravity is moved toward the second lowered position, and the boom assembly pivots toward a raised position when the base is moved toward the retracted position and the center of gravity is moved toward the elevated position; and a drive system coupled to at least one of the first and second wheel assemblies and configured to propel the vehicle.

15. The vehicle of claim 14, further comprising a control system coupled to the drive system and the boom assembly, wherein the control system is configured to allow the drive system to propel the vehicle at a first speed when the boom assembly is in the lowered position, and the control system is configured to allow the drive system to propel the vehicle at a maximum second speed less than the first speed when the body is in the retracted position.

16. The vehicle of claim 14 wherein the boom assembly is pivotally coupled at a first location to the first base portion and pivotally coupled at a second location to the second base portion, wherein movement of the boom assembly between the raised and lowered positions causes the base to move between the retracted and extended positions.

17. The vehicle of claim 14 wherein the base has first and second portions substantially aligned with the longitudinal axis and moveable relative to each other to change the length of the body relative to the longitudinal axis when the base moves between the extended and retracted positions.

18. The vehicle of claim 14 wherein the base has first and second portions that are articulatable relative to each other in a plane substantially parallel to the longitudinal axis in response to movement of the boom assembly between the raised and lowered positions.

19. The vehicle of claim 14 wherein the boom assembly has a first boom portion moveable relative to the body in a plane substantially parallel with the longitudinal axis, and wherein the first boom portion is substantially restricted from moving laterally relative to the plane.

20. The vehicle of claim 19 wherein the boom assembly has a second boom portion pivotally connected to a distal end of the first boom portion, and the second boom portion is moveable laterally relative to the plane.

21. The vehicle of claim 14 wherein the base includes a counterweight configured to move substantially vertically when the base is moved between the extended and retracted positions.

22. The vehicle of claim 14 wherein the boom assembly is a telescoping boom having a distal portion coupled to a support structure.

23. The vehicle of claim 22 wherein the support structure is a personnel basket.

24. The vehicle of claim 14 wherein the boom assembly has a first boom portion moveable relative to the body in a plane substantially parallel with the longitudinal axis, and wherein the boom is substantially restricted from moving laterally relative to the plane.

25. The vehicle of claim 24 wherein the boom has a second portion pivotally connected to the first portion, and the second portion is moveable laterally relative to the plane.

26. An extendible vehicle assembly having a center of gravity, comprising:

a body having a longitudinal axis and first and second body portions coupled to first and second ground-engaging members, respectively, the first and second ground-engaging members being longitudinally spaced apart from each other to define a variable support base, the first and second body portions being moveable between extended and retracted positions, wherein when the body is in the retracted position the support base has a first longitudinal length and an end portion of the second body portion spaced away from the second ground-engaging members is at a raised position and the center of gravity is at an elevated position, and when the body is in the extended position the support base has a second longitudinal length greater than the first length and the end portion of the second body portion is at a lowered position and the center of gravity is at a second lowered position vertically lower than the elevated position; and a boom pivotally coupled to the base and moveable in a vertical plane relative to the body between raised and lowered positions, wherein the boom assembly moves toward the lowered position when the body is moved toward the extended position and the center of gravity is moved toward the second lowered position, and the boom assembly moves toward the raised position when the body is moved toward the retracted position and the center of gravity is moved toward the elevated position.

* * * * *